United States Patent
O'Malley et al.

(10) Patent No.: US 7,934,582 B2
(45) Date of Patent: May 3, 2011

(54) ENGINE SILENCING AND VIBRATION REDUCTION SYSTEM AND METHOD

(75) Inventors: Edward Joseph O'Malley, Reno, NV (US); Glenn Thomas Williamson, Reno, NV (US); Richard Glen Shaff, Reno, NV (US)

(73) Assignee: Go Green APU LLC, Altoona, PA (US)

( * ) Notice: Subject to any disclaimer, the term of this patent is extended or adjusted under 35 U.S.C. 154(b) by 507 days.

(21) Appl. No.: 11/899,682

(22) Filed: Sep. 7, 2007

(65) Prior Publication Data
US 2009/0065294 A1 Mar. 12, 2009

(51) Int. Cl.
| | |
|---|---|
| F01N 1/06 | (2006.01) |
| F01N 1/08 | (2006.01) |
| F01N 5/00 | (2006.01) |
| F02B 77/08 | (2006.01) |
| F02M 35/00 | (2006.01) |
| F02M 35/10 | (2006.01) |
| B64D 33/02 | (2006.01) |
| A61F 11/06 | (2006.01) |

(52) U.S. Cl. ........ 181/270; 181/206; 181/212; 181/214; 181/229; 181/264; 181/267; 123/184.36; 123/184.53; 123/184.57; 123/319; 381/71.14; 381/71.5

(58) Field of Classification Search .......... 181/270, 181/229, 206, 212, 214, 264, 267; 123/319, 123/184.36, 184.53, 184.57; 381/71.14, 381/71.5
See application file for complete search history.

(56) References Cited

U.S. PATENT DOCUMENTS

| | | | | | |
|---|---|---|---|---|---|
| 2,510,440 | A | * | 6/1950 | Vokes | 96/380 |
| 2,510,441 | A | * | 6/1950 | Vokes | 96/386 |
| 2,553,326 | A | * | 5/1951 | Manning | 96/387 |
| 2,562,101 | A | * | 7/1951 | Hoyle | 181/255 |
| 3,712,416 | A | * | 1/1973 | Swanson et al. | 181/229 |
| 3,936,606 | A | * | 2/1976 | Wanke | 381/71.5 |
| 3,949,716 | A | * | 4/1976 | Liu | 123/403 |
| 3,966,014 | A | * | 6/1976 | Gowing | 181/229 |
| 4,125,171 | A | * | 11/1978 | Morris | 181/265 |
| 4,183,332 | A | * | 1/1980 | Hofbauer et al. | 123/184.42 |
| 4,204,586 | A | * | 5/1980 | Hani et al. | 181/229 |
| RE30,306 | E | * | 6/1980 | Moore et al. | 181/229 |
| 4,244,441 | A | * | 1/1981 | Tolman | 181/213 |
| 4,263,982 | A | * | 4/1981 | Feuling | 181/256 |
| 4,886,034 | A | * | 12/1989 | Lambert | 123/587 |
| 5,164,550 | A | * | 11/1992 | Beidl et al. | 181/229 |
| 5,365,025 | A | * | 11/1994 | Kraai et al. | 181/249 |
| 5,413,189 | A | * | 5/1995 | Browning et al. | 181/268 |
| 5,535,720 | A | * | 7/1996 | Pantalleresco | 123/349 |
| 5,596,962 | A | * | 1/1997 | Tsunoda et al. | 123/184.39 |
| 5,706,779 | A | * | 1/1998 | Hewitt | 123/332 |
| 5,926,954 | A | * | 7/1999 | Wolf et al. | 29/890.08 |
| 6,464,036 | B1 | * | 10/2002 | Yenner et al. | 181/229 |
| 6,659,221 | B2 | * | 12/2003 | Kuroda et al. | 181/214 |

(Continued)

*Primary Examiner* — Elvin G Enad
*Assistant Examiner* — Christina Russell
(74) *Attorney, Agent, or Firm* — Alan G. Towner, Esq.; Pietragallo Gordon Alfano Bosick & Raspanti, LLP

(57) ABSTRACT

A noise and vibration reduction system for an engine affixed to a body and a method for reducing vibrations in the body produced by that engine during operation. The present invention is particularly related to noise and vibration reduction in auxiliary power units installed on long-haul trucks and similar types of transportation vehicles. The primary noise and vibration reduction components of the present invention include an air intake silencer, a vibration tuner, and an engine speed limiter.

13 Claims, 3 Drawing Sheets

U.S. PATENT DOCUMENTS

| | | |
|---|---|---|
| 6,705,267 B1 * | 3/2004 | Westerbeke et al. ..... 123/184.53 |
| 6,736,238 B2 * | 5/2004 | Kerr .............................. 181/267 |
| 6,796,859 B1 | 9/2004 | Justen |
| 6,799,657 B2 * | 10/2004 | Daniels ......................... 181/252 |
| 7,174,872 B2 * | 2/2007 | Kino et al. ............... 123/184.57 |
| 2002/0073949 A1 * | 6/2002 | Watanabe et al. ........ 123/184.36 |

* cited by examiner

ENGINE SILENCING AND VIBRATION REDUCTION SYSTEM AND METHOD

BRIEF DESCRIPTION OF THE INVENTION

The present invention is related to systems and methods for silencing the operation of an engine affixed to a body and reducing vibrations in the body produced by that engine during operation. The present invention is particularly related to noise and vibration reduction in auxiliary power units installed on long-haul trucks and similar types of transportation vehicles. The primary noise and vibration reduction components of the present invention include an air intake silencer, a vibration tuner, and an engine speed limiter.

BACKGROUND OF THE INVENTION

Transport trucks that haul goods over great distances in Europe, the Americas and other parts of the world are often referred to as long-haul trucks. In addition to a bed, the cabins of long-haul trucks are often configured to include microwaves, air conditioners, heaters, refrigerators, televisions, stereos and other electric appliances that require significant amounts of power. Long-haul trucks or big rigs will travel hundreds of miles in a day, over many days, often stopping only long enough to allow the driver to eat and take care of personal necessities and to rest and sleep, but when they do stop, many drivers want to use two or more of these appliances at the same time, such as an air conditioner, microwave, and television.

Such conveniences are very important to many drivers, and given the increasing shortage of long-haul truck drivers, truck fleet owners are seeking new ways to attract drivers by providing a more luxurious cab environment. Some trucking fleets have up to 100% turn over from year to year because the drivers are not satisfied with the life style provided by the fleet company. Yet, it costs a trucking company at least three thousand dollars to train new drivers, even if they have prior experience, so obviously, the quality of life of the driver is a key to success in the industry.

When a long-haul truck does need to stop, the driver might be able to do so at a truck stop, which is a specialized facility for providing fuel, maintenance, parking, and convenience services. At other times, the trucks will stop wherever they can safely do so, such as at roadsides, rest stops and fueling stations. Although some truck stops provide auxiliary power tethers to the trucks, most drivers prefer to stop when and where it proves to be most convenient, and to idle their main engines while stopped to provide power to the cabin of the truck. In the United States, a typical long-haul truck idles 2,500 hours per year, with the main engine consuming as much as 1.2 gallons per hour. As fuel prices increase, however, it is getting prohibitively expensive for drivers to idle the main engines for hours at a time. At a fuel cost of $3.00 per gallon, idling costs as much as $9,000 per year. Furthermore, many countries are instituting laws that make it illegal to idle a truck engine for extended periods of time to cut down on air pollution. Idling the engine for hours also decreases the amount of time between engine overhauls without increasing the productivity of the vehicle.

Lastly, the noise generated by a running main engine, even at idle speeds, is considerable both inside and outside of the truck, and the amount and intensity of vibrations generated inside the cabin of the truck can be considerable. Reducing the noise generated by a truck when stopped will improve the quality of life for the driver and passengers of the truck as well as those around the truck, making it more acceptable for the trucks to stop for longer periods of time in certain areas. Reducing the vibrations within the trucks improves the quality of life for those inside the truck. There are relatively few things truck owners can do to make life more enjoyable for truck operators once they are on the road and maintain profitable businesses, but improving the quality of the operator's rest periods is an important one.

Accordingly, a number of companies have begun to supply auxiliary power units (APUs) to provide climate control and 120-volt power, to cut back on fuel consumption and air pollution, to reduce operating hours on the main vehicle engine, and to improve driver comfort and quality of life when on the road. A typical APU consumes about 0.2-0.3 gallons per hour, with significantly lower annual maintenance costs, thereby saving drivers/truck owners more than $7,000 per year in fuel costs alone. In the European Union, where long-haul trucks only idle about 1,800 hours per year, but fuel costs much more per gallon, the idle cost savings alone are over $8,500 per year.

The APUs currently on the market, however, share certain features and disadvantages. For example, most APUs use small diesel engines for power, but depending on the size of those engines, they may only be able to provide a limited amount of DC power. Others are incapable of providing AC power because they do not include an AC power generator. Furthermore, many of the diesel engines powered APU's are noisy to operate, even with a muffler installed on the exhaust system, and generate a significant amount of vibration throughout the cabin, especially when the engine is mounted under the cabin or attached to the frame rail of the truck, where the vibrations can readily travel to the cabin.

In many cases, airborne noise, such as that produced by the cylinder exhaust ports of the engine, is propagated in and transmitted through the exhaust pipe wall and radiated as shell noise or transmitted to the vehicle through the engine mounts. Mufflers are typically utilized to reduce exhaust noise. A muffler typically includes a resonating chamber, which is designed to have opposite sound waves collide and cancel each other out. Internal combustion engines also typically include an air intake system for receiving air that is later mixed with fuel and combusted in the engine cylinders. Noise from the engine, however, also typically travels through the air intake system, through the engine, and back into the atmosphere. In certain smaller engines, especially where the exhaust is in close proximity to the air intake, such as in an APU, noise traveling from the engine through the air intake can be a significant noise source. This is particularly true when the engine is operated at higher speeds, as is necessary when a two or three cylinder APU is utilized to drive an AC power generator.

Air intake silencers have often been used to muffle, and therefore reduce, the level of sound energy generated by these types of engines. An air intake silencer can also attenuate the sound waves produced by the entering air. Noise reduction is often achieved by the provision of sound deadening baffles within the silencer housing. Silencers are often constructed as a combined air silencer/filter module. For instance, a filter membrane may be supported around the silencer housing which defines the annular inlet into the silencer so that the air flow is filtered as it passes radially into the silencer housing. However, it is also know that the introduction of a filter in the airflow, especially near the silencer intake can introduce noise into the engine as well.

While mufflers and intake silencers can reduce noise, which in turn can reduce some vibrations, noise reduction techniques are not typically focused on vibration reduction as well, which might exist in the absence of significant noise.

DETAILED DESCRIPTION OF THE INVENTION

The present invention is related to systems and methods for silencing the operation of an engine affixed to a body and reducing vibrations in the body produced by that engine during operation. The present invention is particularly related to noise and vibration reduction in auxiliary power units installed on any type of body, including long-haul trucks and similar types of transportation vehicles. The primary noise and vibration reduction components of the present invention include an air intake silencer, a vibration tuner, and an engine speed limiter.

Due to the structural integrity of the frame rails of a truck or similar vehicle, an APU is ideally mounted to one of the frame rails to provide a very stable mounting environment. However, it is not always possible or feasible to mount the APU to the frame rails, so APU's are often mounted below or attached to the cabin of the truck. Mounting the APU close to the cabin can reduce the cost of the installation by reducing the length of the umbilical cord (primarily comprised of electrical lines) between the APU and the truck cabin where the main controller for the APU is located. At the same time, mounting the APU close to the cabin increases the truck driver's awareness of the sound of the APU and the driver's sensitivity to vibrations created by the operation of the APU.

Figure 1:
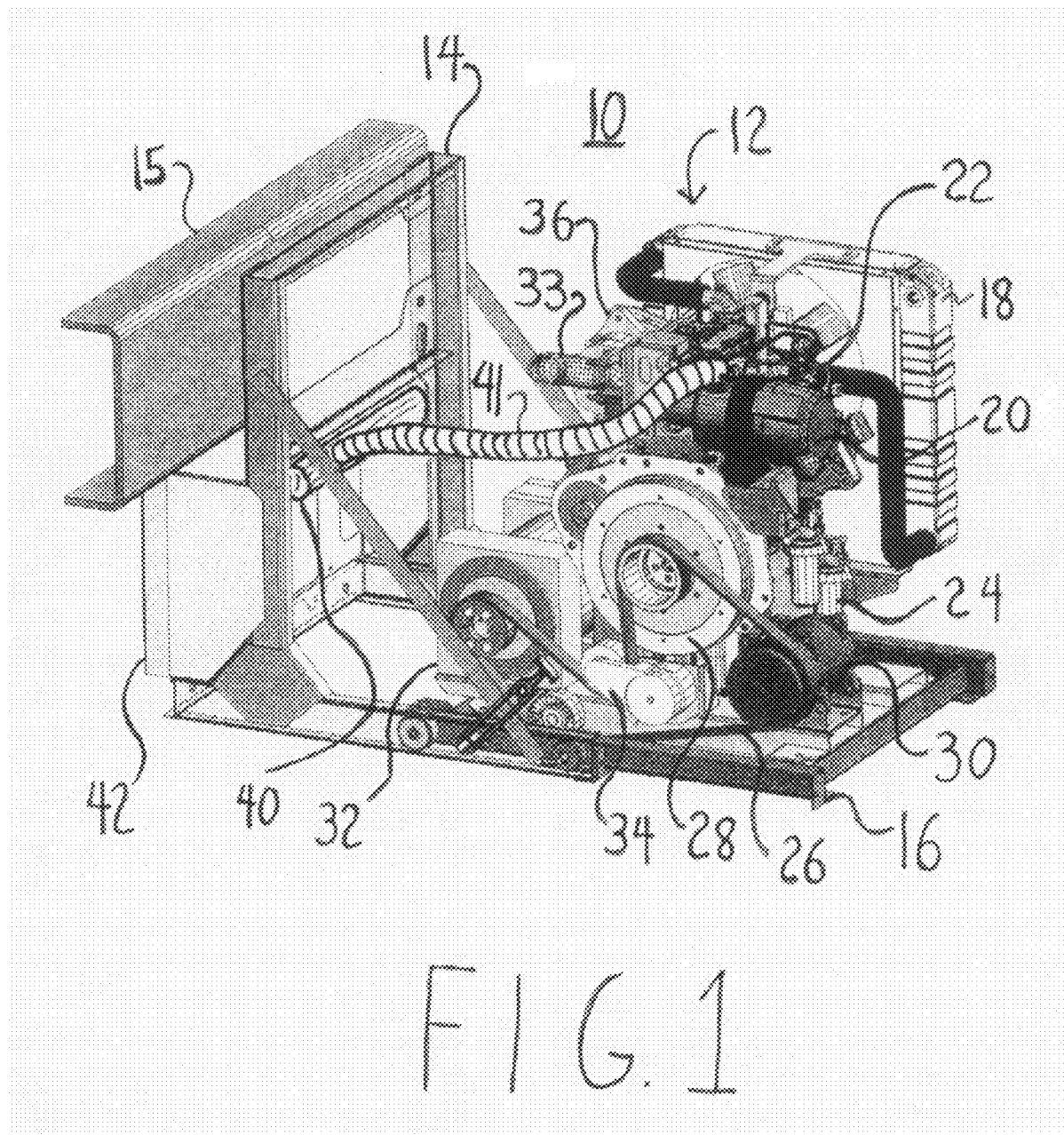
FIG. 1 is a perspective view of the front and left side (when facing the APU from the side of the truck) of an APU in its service/maintenance position with an air intake silencer installed on the frame assembly of the APU.

While FIG. 1 illustrates an APU mounted to a frame rail via a frame assembly, the present invention is applicable to any mounting location or type of mounting for an APU or other type of engine to a body, such as a truck, car, airplane, other form of transportation, or even a building. FIG. 1 provides a perspective view of the front and left side of APU 10 when viewed facing the side of the truck to which the APU 10 is mounted. The APU 10 includes the APU engine 12, which is a two or three cylinder diesel engine mounted to a frame assembly 14, which includes a sliding component 16. The frame assembly 14 is attached to the frame rail 15 of the truck, but the sliding component 16 enables the entire diesel engine 12 to be pulled away from the truck and easily accessed by anyone needing to service the engine.

FIG. 1 illustrates the APU engine 12 when the sliding component 16 has been pulled away from the frame assembly 14, such as when it is being serviced. In order for the engine 12 to be pulled away from the truck on the sliding component 16, certain mechanical and electrical components need to be designed to facilitate this type of movement without breaking down over a number of years, such as the electrical wiring, hoses, exhaust pipes and other similar components. For example, the electrical wiring between the APU 10 and the truck cabin is provided through a spring-shaped umbilical cord consisting of power wires and communication wires. The spring shape of the cord enables it to stretch out when the APU is pulled away from the truck for service, and to shrink back into a smaller size when the APU is in its normal operating position, all without putting undue stress on the wires within the cord. Likewise, the exhaust pipe is connected with a flexible metal hose and a quick-fit connector, rather than welded in place.

As noted, the APU engine 12 is typically a two or three cylinder diesel engine capable of generating approximately 10-30 horsepower at varying revolutions per minute, such as the Yanmar™ TNV Series-1 engines, although other types and sizes of engines could be utilized. As illustrated in FIG. 1, some of the typical major engine driven components of the engine 12 that are visible include a water/coolant radiator 18, an air intake housing 20, its air intake spout 22, and fuel filters 24, on the right-hand side of the engine. At the front of the engine 12, driven by the serpentine belt 26 are the engine flywheel 28, the air conditioning compressor 30, the AC power generator 32, and the belt tensionor 34, although it is optional as to whether the engine driven components need include the AC power generator 32 or the air conditioning compressor 30. The DC power alternator 36 is shown on the back left-hand side of the engine 12, as is the exhaust pipe 33.

Also illustrated in FIG. 1 is the air intake silencer 40, which is mounted to frame assembly 14. It is preferable to mount the air intake silencer 40 in a location that will enable the air intake silencer 40 to draw air for use by the engine 12 from an area that is not too close to the engine 12. Although the location of the air intake silence 40 as illustrated in FIG. 1 is close to the engine, the air intake opening (as shown by air intake opening 55 of FIG. 3) is positioned so as to draw air from the air intake 48 illustrated in FIG. 2, which allows the silencer 40 to draw air from outside of the environmental shell 44 (also illustrated in FIG. 2). Naturally, the exhaust pipe 33 would need to be routed to a position that was away from the air intake 44. The air intake silencer 40 could also be mounted to a completely different part of the vehicle so as to be as far away from noise sources as possible.

Regardless of where the air intake silencer 40 was located, it would be connected to one end of the flexible hose 41, the opposite end of which would be connected to the air intake spout 22 of the air intake housing 20. As shown in FIG. 1, the air intake silencer 40 is mounted in series with the air intake housing 20 (which may or may not include an air cleaner). Since many air intake housings provide some existing level of noise reduction, mounting the air intake silencer 40 in series with the air intake housing 20 serves to further reduce the level of noise generated by the engine 12. In the absence of an existing air intake housing 20, the air intake silencer 40 could be mounted directly to an air intake port for the engine 12. Alternatively, the air intake silencer 40 could be mounted in parallel with the existing air intake housing. Whenever the air intake silencer 40 is mounted directly to the air intake port of the engine 12, it is desirable to also provide some form of air filtration for the silencer 40 so as to keep dust and debris from being drawn into the engine.

Figure 2:
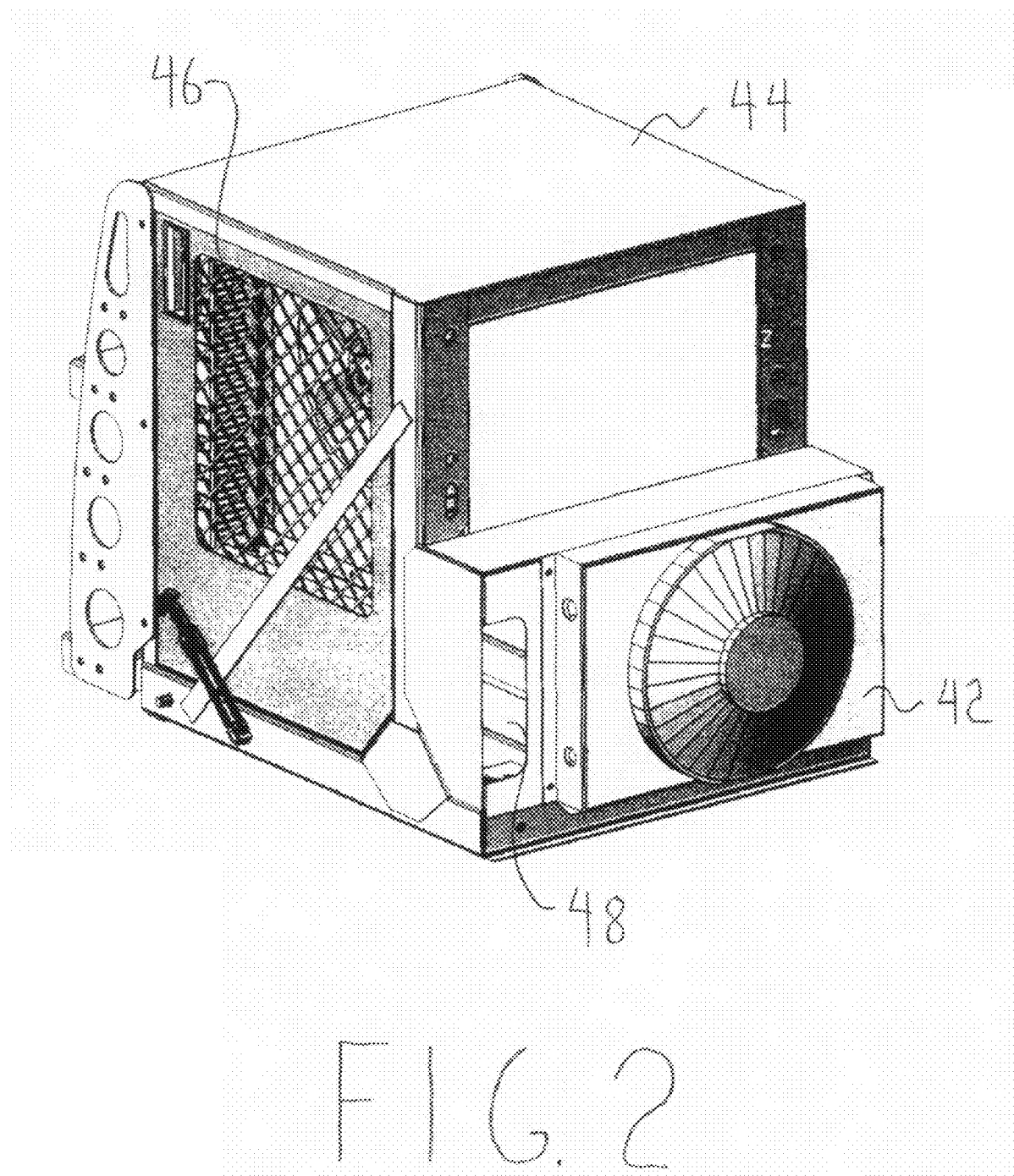
FIG. 2 is a perspective view of the back and right side of the APU of FIG. 1, including a cover over the APU.

As further illustrated in FIG. 1, the backside of the air conditioning condenser and fan 42 is shown. A perspective view of the front and right side of the condenser and fan 42 is further illustrated in FIG. 2. The condenser and fan 42 need not be co-located with the engine 12, if space in the area of the APU installation is at a premium, or if the owner/operator prefers to move the condenser and fan 42 as far away from the truck cabin as possible, so as to further reduce noise inside the cabin. As illustrated in FIG. 2, the APU 10 can be covered by an environmental shell 44, which further reduces the level of noise produced by the APU engine 12. FIG. 2 shows the APU 10 as positioned in its normal operating position. The environmental shell 44 provides protection to the APU engine 12 when the truck is on the road, while allowing sufficient air to move through the shell, such as through screen 46. As illustrated in FIG. 2, hot air surrounding the engine and the radiator is expelled through an opening in the environmental shell 44 and past screen 46.

Although air can enter the environmental shell 44 from a number of locations, air intake 48 can be important because it brings air into the shell 44 very close to the air intake opening of the air intake silencer 40, as described above. Air intake 48 also provides an access point through which wires and hoses can run in and out of the environmental shell 44. Since different types of trucks will require different types of APU 10 installations, with or without environmental shells of the type shown in FIG. 2, many different air intake/exhaust combinations could be utilized. It is preferable that air entering the air intake silencer 40 be cooler than the air being exhausted from the engine 12 and that the air routed to the air intake silencer 40 not introduce additional harmonics to the air being pulled into the engine 12 through the air intake silencer 40.

Figure 3:
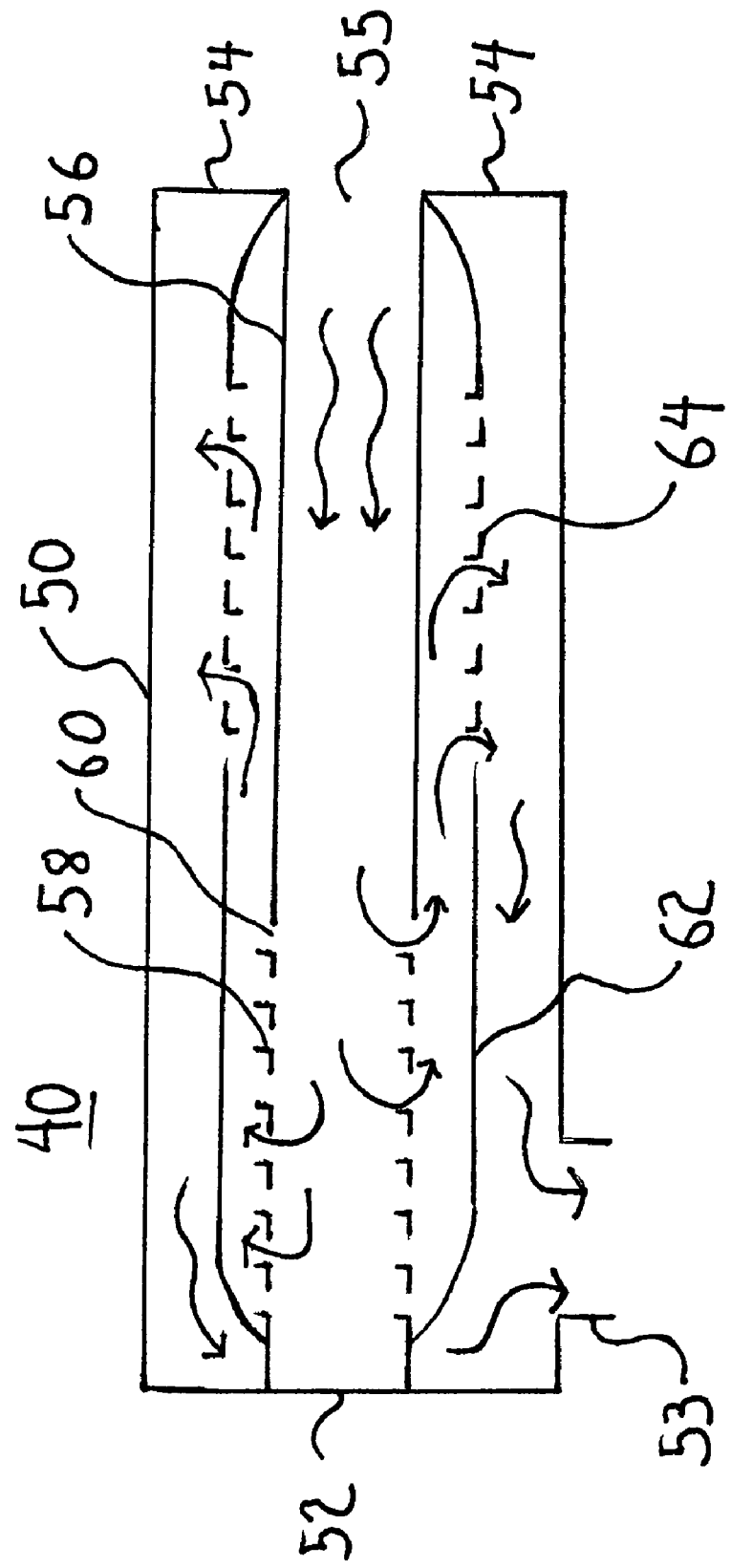
FIG. 3 is a cut-away view of the air intake silencer of FIG. 1.

A cut-away view of air intake silencer 40 is illustrated in FIG. 3. Air intake silencer 40, for a three cylinder diesel engine displacing about 850 cc of air, is comprised of an outer cylindrical wall 50 of about sixteen inches in length, with a closed end 52 and a partially open end 54, each about three inches in diameter, and a exit port formed by the extended walls 53. Larger and smaller engines displacing different amounts of air would require larger or smaller silencers. For example, a two cylinder diesel engine displacing about 570 cc of air would require a silencer of about two-thirds of the size of the three cylinder silencer.

The air intake silencer 40 is further comprised of a first interior, cylindrical wall 56 that surrounds the open portion of partially open end 54, thereby creating air intake 55, and extends to and connects with the closed end 52. A first series of baffles 58 are situated within and along a length of first interior wall 56 toward the end of first interior wall 56 and away from air intake 55. The first series of baffles 58 are formed by punching holes through the first interior wall 56 in a number of places in such a way as to leave a flap 60 of the punched out material hanging from one end of each hole formed therein.

A second interior cylindrical wall 62 is formed around the first interior wall 56, extending from the partially open end 54 to just beyond the first series of baffles 58. As with the first series of baffles 58, a second series of baffles 64 is formed in the second interior wall 62 towards its end closed to the partially open end 54. All of the exterior and interior walls of the air intake silencer 40 are preferably formed from stainless steel.

As illustrated by the series of arrows shown within the air intake silencer 40, air would enter through the air intake 55 and travel down first interior wall 56, where the air would exit through the first series of baffles 58. The air would then travel between the first interior wall 56 and the second interior wall 62 until the air exited through the second series of baffles 64. The air would then travel between the second interior wall 62 and the inside face of the outer cylindrical wall 50 until it exited through the exit port formed by the extended walls 53. The flexible hose 41 shown in FIG. 1 would be connected to the extended walls 53 to lead air from the air intake silencer 40 to the air intake spout 22 of air intake housing 20.

The purpose of the air intake silencer 40 is to change the harmonics of the air by smoothing the air flow and by canceling or attenuating sound waves coming in through the air intake silencer 40 before being led to the air intake housing 20. As air courses through the air intake silencer 40, sound waves carried along with the air are attenuated or cancelled out by the arrangement of the interior of the air intake silencer 40, thereby reducing the amount on noise introduced to the engine 12 through its air intake system and accordingly reducing the amount of noise exiting the engine 12 through its exhaust system. Although the air intake silencer 40 is particularly well suited for use with a two or three cylinder diesel engine, different engines utilized in different environments may require a differently constructed air intake silencer, such as one that attenuates sound waves at frequencies other than those produced by the engine 12. Hence, while the particular construction of the air intake silencer 40 is important, differently constructed air intake silencers could be readily substituted for air intake silencer 40, in combination with the other elements of the present invention noted herein, without departing from the teaching of the present invention.

While the sound waves introduced to the engine 12 are attenuated through use of the air intake silencer 40, further reductions can be achieved by reducing the normal engine speed of the engine 12. Engine 12 normally operates at an engine speed of 3200 rpm. By reducing the engine speed to about 3000 rpm, a significant sound reduction can be achieved. In particular, an almost 8 dB reduction in noise has been measured by combining the air intake buffer with the engine speed reduction and an appropriate muffler. Not only does lowering the engine speed reduce noise, but it also lowers fuel consumption and harmonics produced by the engine.

While it may seem fairly obvious to lower an engine's speed so as to reduce the amount of noise generated by that engine, reducing the engine's speed can have a negative effect on the operation of some the engine driven components, therefore making it a less than obvious choice for achieving a constant level of noise reduction. For example, the AC power generator 32 needs to be rotated at a certain speed, via the serpentine belt 26, in order to generate 110 volts of AC power. Thus, simply reducing the speed of the engine 12, without utilizing a smaller pulley on the generator 32 or shortening the serpentine belt 26 accordingly, would lower the operating speed of the AC power generator 32 to a point where it could no longer generate sufficient AC voltage to drive a desired load. To correct this, a smaller diameter pulley can be used on the AC power generator 32 or the length of the serpentine belt 26 can be reduced by about one inch, which causes the generator 32 to rotate at a higher rate than it typically would at a correspondingly reduced engine speed. With the lowered engine speed and the smaller pulley or adjusted drive belt 26, the engine is still able to produce sufficient AC power to drive a needed load. For example, it was found that even with a load of 6000 W (the maximum load rating for the three-cylinder Yanmar™ TNV Series-1 engines used in this application), the AC power generator 32 was able to generate 98.1 volts AC, even at the optimum lower engine speed, with the adjusted pulley or the shortened serpentine belt, without causing the engine to stall.

Although some engines are electronically controlled such that engine speed can be controlled through program control, many engines, such as the Yanmar™ TNV Series-1 engines, have a manual throttle with a throttle limiter on the injection pump for adjusting engine speed. By replacing the standard throttle limiter with a threaded bolt and nut adjusted to an appropriate length, it is possible to adjust the maximum engine speed to the desired engine speed, which will be optimized for sound reduction for that particular engine, without otherwise altering the engine. As with AC power generation, when adjusting engine speed below certain RPM levels, it may be necessary to also adjust the fuel injection timing in order to obtain an optimum speed at which the engine can function properly.

In addition to reducing noise produced by the engine 12, reducing the speed of the engine can reduce vibrations generated by the engine. Since many truck drivers are used to sleeping in the presence of a noisy, vibrating main engine, one would tend to believe that any reduction in sound and vibrations would be appreciated, but this is not always the case. A driver's tolerance levels for noise and vibration can alter dramatically when an APU is installed, even though the APU may be much quieter than a main engine. Even a very quiet APU 10, with an air intake silencer 40 and a reduced engine speed, can over time produce intolerable levels of vibrations within the cabin of the truck. To make matters worse, every truck is different, so an APU that produces only a few vibrations when installed in one truck may produce intolerable levels when installed in another.

It is therefore preferable, when installing an APU 10 in a truck, to make slight adjustments to the speed of the engine so as to tune out as many vibrations caused by the APU 10 as possible. Even a change of up to 100 rpm, higher or lower, may be sufficient to reduce the most annoying vibrations, and from case to case may further achieve a noise reduction of up to 1 dB. With respect to the Yanmar™ engines noted above, this can be carried out by simply adjusting the position of the nut on the throttle limiter bolt—with a longer bolt increasing the speed and a shorter bold decreasing the speed. As long as the engine speed is not changed by too many RPM, the engine speed should not have an adverse impact on the operating capabilities of the engine driven components.

While sound waves introduced to the engine 12 can be attenuated or reduced through use of the air intake silencer 40 and by reducing the normal engine speed to an optimum engine speed, still further reductions can be achieved through use of sound cancellation audio system. Such systems are well known in the art and need not be disclosed in detail herein for purpose of this invention. A basic sound cancellation audio system operates by detecting audible sound waves being generated by a source, such as an engine, and generating and broadcasting in near real-time cancelling sound waves, which are at half-wave frequencies of the detected sound waves. The sound waves would be detected in or near the inside of a vehicle cabin where a passenger would be located and the cancelling sound waves would be broadcast inside that cabin so as to cancel the detected sound waves.

The present invention, while illustrated and described in terms of a preferred embodiment and several alternatives, is not limited to the particular description contained in this specification. Additional alternative or equivalent components and steps could be used to practice the present invention.

The invention claimed is:

1. A noise and vibration reduction system for an engine mounted to a body, the engine being operative to drive one or more engine driven components for use by the body, comprising:

an air intake silencer coupled to an air intake of the engine, the air intake silencer including one or more interior walls and an outer cylindrical wall forming a closed wall, a partially open air intake opening, and an exit port, the one or more interior walls including a series of baffles, each baffle from the series of baffles forming a hole with a flap hanging from an end of the hole, where air entering the air intake silencer must pass through the series of baffles before entering the engine which reduces sound waves introduced to the engine through the air intake and smoothes air flow into the engine, wherein the one or more interior walls include:

a first cylinder having a first end forming the partially open air intake opening and a second end forming the closed wall, the first cylinder also forming a first series of baffle holes from the series of baffles near the second end through which air entering through the air intake opening will travel;

a second cylinder formed around the first cylinder so as to create a first air passage between the first cylinder and the second cylinder, the second cylinder having a first closed end connected to the first cylinder near the second end and beyond the first series of baffle holes and a second closed end connected to the first cylinder near the first end, the second cylinder forming a second series of baffle holes from the series of baffles near the second closed end through which air traveling from the first series of baffle holes and along the first air passage will pass; and a third cylinder formed around the second cylinder so as to create a second air passage between the second cylinder and the third cylinder, the third cylinder having a first exterior end connected near to the first end of the first cylinder and near to the second closed end of the second cylinder and a second exterior end connected near to the closed wall of the second end of the first cylinder and near to the first closed end of the second cylinder, the third cylinder having an extended wall near the second exterior end forming the exit port through which air traveling from the second series of baffle holes and along the second air passage will pass to exit the air intake silencer.

2. The noise and vibration reduction system of claim 1, wherein the engine driven components include an AC generator.

3. The noise and vibration reduction system of claim 1, wherein the air intake silencer is sized to match an amount of air displaced by operation of the engine.

4. The noise and vibration reduction system of claim 1, further comprising a sound cancellation audio system for cancelling engine noise within the body.

5. The noise and vibration reduction system of claim 1, wherein the engine includes an air intake housing that is coupled to the air intake of the engine, and wherein the air intake silencer is coupled to the air intake by being connected in series with the air intake housing.

6. A noise reduction system for an auxiliary power unit (APU) mounted to a body, the APU being operative to drive one or more engine driven components for use by the body, comprising:

an exhaust pipe coupled to an exhaust of the APU; and an air intake silencer coupled to an air intake of the APU, the air intake silencer including one or more interior walls and an outer cylindrical wall forming a closed wall, a partially open air intake opening, and an exit port, the one or more interior walls including a series of baffles, each baffle from the series of baffles forming a hole with a flap hanging from an end of the hole, where air entering the air intake silencer must pass through the series of baffles before entering the APU which reduces sound waves introduced to the APU through the air intake and smoothes air flow into the APU, wherein the one or more interior walls further include:

a first cylinder having a first end forming the partially open air intake opening and a second end forming the closed wall, the first cylinder also forming a first series of baffle holes from the series of baffles near the second end through which air entering through the air intake opening will travel;

a second cylinder formed around the first cylinder so as to create a first air passage between the first cylinder and the second cylinder, the second cylinder having a first closed end connected to the first cylinder near the second end and beyond the first series of baffle holes and a second closed end connected to the first cylinder near the first end, the second cylinder forming a second series of baffle holes from the series of baffles near the second closed end through which air traveling from the first series of baffle holes and along the first air passage will pass; and a third cylinder formed around the second cylinder so as to create a second air passage between the second cylinder and the third cylinder, the third cylinder having a first exterior end connected near to the first end of the first cylinder and near to the second closed end of the second cylinder and a second exterior end connected near to the closed wall of the second end of the first cylinder and near to the first closed end of the second cylinder, the third cylinder having an extended wall near the second exterior end forming the exit port through which air traveling from the second series of baffle holes and along the second air passage will pass to exit the air intake silencer.

7. The noise reduction system of claim 6, wherein the engine driven components include an AC generator.

8. The noise reduction system of claim 6, wherein the air intake silencer is sized to match an amount of air displaced by operation of the APU.

9. The noise reduction system of claim 6, further comprising a sound cancellation audio system for cancelling APU noise within the body.

10. The noise reduction system of claim 6, wherein the APU includes an air intake housing that is coupled to the air intake of the APU, and wherein the air intake silencer is coupled to the air intake by being connected in series with the air intake housing.

11. A method for reducing noise and vibrations produced by an engine mounted to a body, the engine being operative to drive one or more engine driven components for use by the body, comprising the steps of:

coupling an air intake silencer to an air intake of the engine, the air intake silencer including one or more interior walls and an outer cylindrical wall forming a closed wall, a partially open air intake opening, and an exit port, the one or more interior walls including a series of baffles, each baffle from the series of baffles forming a hole with a flap hanging from an end of the hole, where air entering the air intake silencer must pass through the series of baffles before entering the APU reducing sound waves introduced to the engine through the air intake and smoothing air flow into the engine, wherein the one or more interior walls include:

a first cylinder having a first end forming the partially open air intake opening and a second end forming the closed wall, the first cylinder also forming a first series of baffle holes from the series of baffles near the second end through which air entering through the air intake opening will travel;

a second cylinder formed around the first cylinder so as to create a first air passage between the first cylinder and the second cylinder, the second cylinder having a first closed end connected to the first cylinder near the second end and beyond the first series of baffle holes and a second closed end connected to the first cylinder near the first end, the second cylinder forming a second series of baffle holes from the series of baffles near the second closed end through which air traveling from the first series of baffle holes and along the first air passage will pass; and a third cylinder formed around the second cylinder so as to create a second air passage between the second cylinder and the third cylinder, the third cylinder having a first exterior end connected near to the first end of the first cylinder and near to the second closed end of the second cylinder and a second exterior end connected near to the closed wall of the second end of the first cylinder and near to the first closed end of the second cylinder, the third cylinder having an extended wall near the second exterior end forming the exit port through which air traveling from the second series of baffle holes and along the second air passage will pass to exit the air intake silencer; and coupling an exhaust pipe to an exhaust of the engine.

12. The method of claim 11, further comprising the step of sizing the air intake silencer to match an amount of air displaced by operation of the engine.

13. The method of claim 11, further comprising the step of cancelling engine noise within the body by detecting audible sound waves being generated by the engine, and generating and broadcasting in near real-time cancelling sound waves at half-wave frequencies of the detected audible sound waves within the body.

* * * * *